Patented Dec. 25, 1951

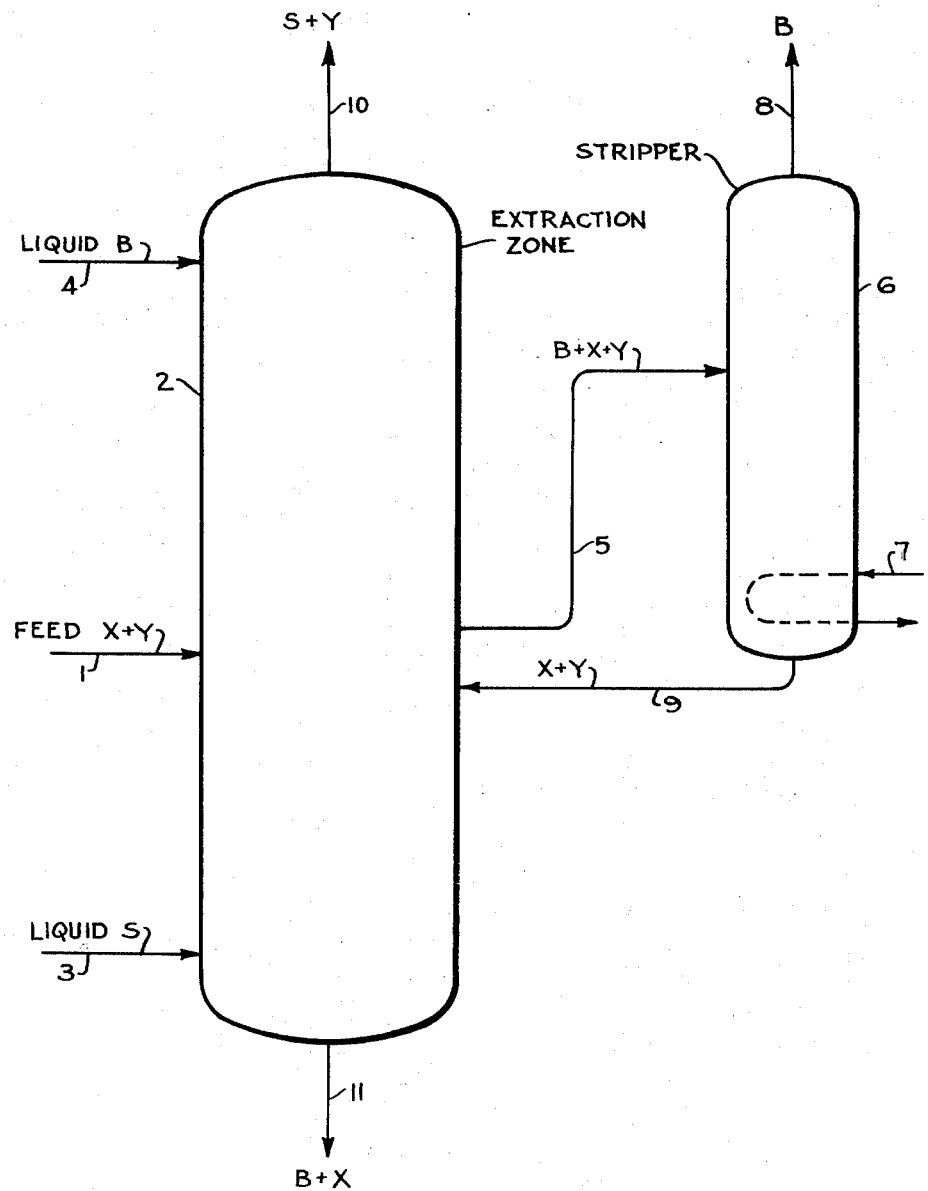

2,579,867

UNITED STATES PATENT OFFICE 2,579,867

EXTRACTION PROCESS

Malcolm L. Sagenkahn, Dobbs Ferry, N. Y., assignor to Shell Development Company, San Francisco, Calif., a corporation of Delaware Application December 19, 1949, Serial No. 133,714

11 Claims. (Cl. 260—601)

The present invention relates to an improved process for the separation of components of liquid mixtures and, more specifically, comprises an improvement in the method of separating such mixtures by the process commonly known as the "duosol" process.

In the solvent extraction of liquid mixtures by the so-called "duosol" process, the liquid mixture to be separated is usually introduced at some intermediate point of the extraction zone wherein two immiscible solvents of different densities are flowing countercurrently.

The liquid mixture to be separated distributes itself throughout the extraction zone between the two solvent phases, depending upon the relative solubilities of its components in the countercurrently flowing solvents under the conditions of operation, the relative proportions of the two solvents, etc.

In many instances when employing the "duosol" type of solvent extraction, it is preferable to employ a high ratio of one solvent to the other in order to obtain a more complete separation of one of the components of the liquid mixture. However, this is usually accomplished at the expense of the yield of the particular compound to be separated. For example, in the purification of crude acrolein containing about 4.5% by weight propionaldehyde in order to produce acrolein having less than 1.0% by weight propionaldehyde it is necessary to use a relatively high ratio, at least 2.0, of one solvent, water, to the other solvent, xylene or isobutylene. But when such a high ratio of water to the other solvent is employed, the percentage loss of the acrolein to the water is great, over 1% of the theoretically recoverable acrolein, which in many instances is prohibitive.

In such circumstances, it is usual to sacrifice the degree of separation (purity of the desired product) for the sake of a more complete recovery (yield) or vice versa. However, when such a compromise is made and a so-called optimum solvent ratio is decided upon, it will usually be found that the size and/or number of the extraction zone(s) required is very large, particularly so when it is considered that most extraction column efficiencies are in the range of 10 to 20% per plate. In many instances, for example, especially where the distribution coefficients of the components of the liquid mixture between the solvents employed in the "duosol" type extraction are close together, a very great number of extraction stages or an extraction column containing from 100 to 200 or more actual plates may be required. Obviously, a column of such size and expense would be a deterrent to the selection of this type of extraction process as a means of separating the components of a liquid mixture.

Heretofore, no method has been proposed in connection with a "duosol" type of solvent extraction whereby it is possible to achieve a very complete separation of a component of a liquid mixture and, at the same time, avoid a substantial loss of said components to one of the solvents.

A principal object of the present invention is to provide an improved method of separating the components of a liquid mixture when employing the "duosol" type of solvent extraction as the method of separation. A further object of the invention is to present a method of operating a "duosol" type of solvent extraction whereby it is possible not only to obtain a complete separation of one of the components but also at the same time recover such component without any substantial loss. A more specific object of the invention is to provide a method whereby the plate or equivalent requirements of a "duosol" type of solvent extraction may be substantially reduced.

It has now been found that it is possible to achieve these and other objects in a solvent extraction process for the separation of components of a liquid mixture wherein said mixture is intimately contacted with countercurrently flowing streams of immiscible solvents by the combination of steps comprising, withdrawing a selected liquid phase from an intermediate section of the extraction zone, separating solvent therefrom and returning the remainder of said selected liquid phase to the extraction zone near the point from which it was withdrawn, preferably downstream therefrom with respect to normal direction of flow of the solvent thus removed.

More specifically, in accordance with the present invention, a liquid mixture containing components to be separated is introduced at some intermediate point of an extraction zone and therein intimately contacted with countercurrently flowing streams of solvents, said solvents being at least partly immiscible under the conditions of operating the invention and having different densities. Also, one of said solvents should exhibit a preferential affinity for a particular component of the mixture to be separated, and another of said solvents should exhibit a preferential affinity for another particular component of the mixture to be separated. Operation of the process is improved by the combination of steps of withdrawing a substantial portion of a selected liquid phase from the extraction zone, preferably near the point of introduction of the feed, removing solvent therefrom and returning the remainder of said selected liquid phase to the extraction zone at a point downstream with respect to the normal direction of flow of the solvent removed, preferably near the point of introduction of the feed, thereby altering the ratio of solvents so that the ratio is different in one zone from what it is in another zone.

It is preferred by the operation of the invention to maintain a substantial difference between the weight ratios of the solvents in the upper and lower sections of the extraction zone or the equivalent in the conventional mixer-settler combination widely used in liquid-liquid extraction. It is even more preferred to maintain by operation of the invention a solvent ratio relationship wherein the weight ratio of one solvent to the other solvent is greater than 1 in one section of the extraction zone and less than 1 in the other section of the extraction zone or the equivalent in a mixer-settler combination.

More specifically, it is preferred to maintain the ratios of the solvents employed in the zone on opposite sides of the point of introduction of the feed mixture containing components X and Y to be separated such that the ratio of one solvent (S) to the other solvent (B) is less than one in the zone on that side of the feed point from which solvent S is removed with a component Y dissolved therein and the ratio of the same solvent S to said solvent B is greater than one on the other side of the feed point from which solvent B is removed with a component X dissolved therein.

The invention is particularly applicable to a "duosol" extraction process when applied to separate a feed mixture wherein Y is the principal component and X is the minor component, utilizing two immiscible solvents, such as B and S, the solvents B and S being selected such that the distribution coefficient of the minor component X between solvents S and B is less than one and the distribution coefficient of the principal component Y between solvents S and B is greater than one. In the application of the invention as applied to such a system as described above, the weight ratio of solvent B to solvent S is maintained substantially greater in a first zone of the extraction system than the weight ratio of solvent B to solvent S in a second zone downstream with respect to the flow of B from said first zone. This difference in ratios is maintained in accordance with the invention by removing from a section of said first zone a liquid phase comprising solvent B as the principal solvent component thereof and a portion of feed components X and Y, separating at least a substantial portion of solvent B therefrom and returning the remainder of said liquid phase, now enriched with respect to components X and Y, to said second zone.

To properly understand not only the reasons giving rise to this invention, but also the invention itself, reference is now made to the accompanying drawing which forms a part of this application, the single figure of which shows an extractive apparatus suitable for commercial practice of the double solvent refining process and of the invention as applied thereto.

The drawing, for simplicity, does not necessarily show all of the auxiliary equipment such as pumps, pipes, valves, outlets, inlets, tanks, heating lines, cooling lines, heat exchangers, and the like, which may be found to be desirable for the most effective operation of the process as applied to a given case under a selected set of operating conditions. The proper selection and placement of such equipment will be evident to one skilled in the art in view of the description of the invention as made hereinbefore.

Referring to the drawing the method of operation is as follows: A liquid mixture containing components X and Y to be separated is introduced (by means of line 1) into extraction zone 2 wherein said liquid mixture is intimately contacted with countercurrently flowing streams of solvents, said solvents being at least partly immiscible under the conditions of operating the invention and which solvents are hereinafter, for the sake of clarity and brevity, referred to as solvent S and backwash B. Solvent S has a lower density than the backwash B and, therefore, upon introduction by means of line 3 into the lower section of the extraction zone will flow toward the upper section; while backwash B being more dense, upon introduction into the upper section of the extraction zone by means of line 4 will flow toward the lower section of the extraction zone. Assuming that solvent S has more affinity for component Y than for component X and assuming that backwash B has more affinity for component X than for component Y, then that part of the extraction zone above the point of introduction of the liquid mixture to be separated, i. e., the feed plate, may be considered as the section in which component X is removed from the solvent S by the backwash B so as to yield an overhead product containing solvent S and substantially pure Y. Likewise, that part of the extraction zone below the feed plate may be considered as the section in which the solvent S removes component Y from the backwash B so as to yield a bottom product containing backwash B and substantially pure X. Therefore, by altering the ratio of backwash B to solvent S in the upper and lower section of the extraction zone, so as to maintain a very high ratio of backwash B to solvent S in the upper section of the extraction zone, component X will be "overabsorbed" in the backwash B resulting in an increase of the amount of X at the feed plate. Because of the very high ratio of backwash B to solvent S a large amount of component Y will also be absorbed in the backwash B. However, this is overcome by maintaining a high ratio of solvent S to backwash B in the lower section of the extraction zone. This is accomplished in carrying out a separation of the type and in the manner described above by either removing the solvent phase or the backwash phase at some point in the extraction zone, preferably in the vicinity of the feed plate such as by means of line 5 and transferring said phase to a separating device such as stripper 6, supplied with heat by means 7, removing all or a portion of the solvent or backwash therefrom by means of line 8 and returning the remainder of said phase to the extraction zone by means of line 9, preferably near the point from which the selected phase was withdrawn and preferably downstream therefrom with respect to the normal direction of flow of the solvent thus removed. At the same time two product streams are removed from the extraction zone, the solvent S phase containing component Y being removed from the upper portion of the extraction zone by means of line 10 and the backwash B phase containing component X being removed from the lower portion of the extraction zone by means of line 11.

The advantages of the invention are clearly evident in its application to the purification of crude acrolein containing as an impurity about 4.5% by weight propionaldehyde. In the purification of crude acrolein by the "duosol" type of solvent extraction, of which the present invention is an improvement, employing xylene as the solvent and water as the backwash, the X component is propionaldehyde, which has a distribution constant of about 0.9 between xylene and water, and acrolein is considered as the Y component, and has a distribution constant between xylene and water of about 1.6 to about 2.3, depending upon the concentration. It is desired to produce acrolein as a purified product containing less than 1.0% weight of propionaldehyde, with a loss of not more than 1.0% of the theoretically recoverable acrolein to the water leaving the bottom of the extraction column. When this separation is made using the conventional "duosol" type of solvent extraction, it is found that 20 theoretical plates are required at an optimum ratio of backwash to solvent in the extraction zone of about 1.2. A ratio lower than 1.2 gives a greater recovery of acrolein but produces a product of insufficient purity, i. e., containing more than 1% by weight propionaldehyde. On the other hand, a ratio higher than 1.2 gives a product of satisfactory purity but a greater and prohibitive loss of acrolein, i. e., over 1.0% of the theoretically recoverable acrolein, to the bottom water phase. However, when the herein described invention is applied to such a "duosol" extraction so as to vary the water-to-xylene ratio of 2.7 in the upper section of the column to a ratio of 0.3 in the lower section, only 9 theoretical plates are required, resulting in a saving of between 55 and 110 actual plates since, as pointed out hereinbefore, most extraction columns plate efficiencies are in the range of 10% to 20%. Similarly the invention is also applicable to the purification of crude propionaldehyde wherein propionaldehyde is the major component and acrolein the contaminant.

The invention is particularly well suited to the so-called "duosol" separation of all types of liquid mixtures, not only liquid mixtures containing only inorganic compounds or organic compounds but also mixtures containing both organic and inorganic compounds for the separation of components, group or groups of components, therefrom. It is considered that the invention is particularly applicable for the separation of hydrocarbon mixtures.

For example, in the application of the "duosol" extraction process for the purification and refining of lubricating oils, propane is employed as the selective solvent for the paraffinic fraction and phenol or cresylic acids or a mixture of the two as the aromatic-naphthenic solvent in order to improve the viscosity-index, color and other properties of lubricating oils. The applicability of the present invention to a process utilizing the above-named solvents for the refining of hydrocarbon lubricating oils is obvious. Both solvents are at least partially immiscible under the conditions of operating the invention and both solvents exhibit a preferential affinity for a particular group or groups of hydrocarbons present in the lubricating oil.

The solvents employed in the practice of the invention may be either inorganic or organic compounds or mixtures of the same provided, of course, that in the practice of the invention, the solvents employed are substantially inert toward themselves and toward the liquid mixture to be separated and are under the conditions of the extraction at least partly immiscible and capable of forming two liquid phases. Also the distribution coefficients between the components of the mixture to be separated and the solvents employed must not be the same.

It is also contemplated that the invention may be practiced under widely varying conditions of temperature and pressure, both subatmospheric and supra-atmospheric as may be best suited for the particular application or required to maintain the solvents and material to be separated in the liquid state. Further, it is also realized that it may be advantageous in many instances, in the practice of the invention, to maintain a temperature gradient throughout the extraction zone.

The extraction zone, as employed in the present invention, may be either a packed column or a baffled column or any other similar type of extraction column or combination of mixer-settlers, conventionally used for liquid-liquid extraction such as are well known to those skilled in the art.

I claim as my invention:

1. In a solvent extraction process for the separation of components of a liquid mixture by intimately contacting said mixture with countercurrently flowing streams of immiscible solvents wherein one of said solvents is introduced at one end of the extraction zone and another of said solvents is introduced at the other end of the extraction zone and wherein the liquid mixture to be separated is introduced at an intermediate section of the extraction zone, the improvement which comprises withdrawing a selected liquid phase from the extraction zone, separating solvent therefrom and returning the remainder of said selected liquid phase to the extraction zone at a point downstream from the point of withdrawal with respect to the flow of the solvent removed.

2. In a solvent extraction process for the separation of a liquid mixture of acrolein and propionaldehyde by intimately contacting said mixture with countercurrently flowing streams of immiscible solvents wherein one of said solvents is introduced at one end of the extraction zone and another of said solvents is introduced at the other end of the extraction zone and wherein the liquid mixture to be separated is introduced at an intermediate section of the extraction zone, the improvement which comprises withdrawing a selected liquid phase from the extraction zone, separating solvent therefrom and returning the remainder of said selected liquid phase to the extraction zone at a point downstream from the point of withdrawal with respect to the flow of the solvent removed.

3. In a solvent extraction process for the separation of a liquid mixture of acrolein and propionaldehyde by intimately contacting said mixture with countercurrently flowing streams of solvents, said solvents being xylene and water, xylene being admitted into one end of the extraction zone and water being admitted into the other end of the extraction zone and wherein the liquid mixture to be separated is introduced at an intermediate section of the extraction zone, the improvement which comprises withdrawing a selected liquid phase from the extraction zone, separating solvent therefrom and returning the remainder of said selected liquid phase to the extraction zone at a point downstream from the point of withdrawal with respect to the flow of the solvent removed.

4. In the solvent extraction process for the separation of a liquid mixture of acrolein and propionaldehyde by intimately contacting said mixture with countercurrently flowing streams of solvents, said solvents being xylene and water, xylene being admitted into one end of the extraction zone and water being admitted into the other end of the extraction zone, such that a water to xylene weight ratio of 2.7 is maintained in the upper section of the extraction zone and wherein the liquid mixture to be separated is introduced at an intermediate section of the extraction zone, the improvement which comprises maintaining a water to xylene weight ratio of 0.3 in the lower section of the extraction zone by withdrawing a portion of the water phase from the upper section, removing water therefrom and returning the remainder to the extraction zone at a point downstream from the point of withdrawal with respect to the flow of water in the extraction zone.

5. In a solvent extraction process for the separation of components of a liquid mixture of organic compounds by intimately contacting said mixture with countercurrently flowing streams of immiscible solvents wherein one of said solvents is introduced at one end of the extraction zone and another of said solvents is introduced at the other end of the extraction zone and wherein the liquid mixture to be separated is introduced at an intermediate section of the extraction zone, the improvement which comprises withdrawing a selected liquid phase from the extraction zone, separating solvent therefrom and returning the remainder of said selected liquid phase to the extraction zone at a point downstream from the point of withdrawal with respect to the flow of the solvent removed.

6. In a solvent extraction process for the refining of hydrocarbon lubricating oil employing propane as the paraffin fraction-solvent and a phenol as the selective solvent for the aromatic and naphthene fractions wherein liquid propane is introduced at one end of the extraction zone and a phenol is introduced at the other end of the extraction zone and the hydrocarbon lubricating oil is introduced at an intermediate section of the extraction zone, and wherein the hydrocarbon lubricating oil fraction is intimately contacted with countercurrently flowing streams of said solvents, the improvement which comprises withdrawing a selected liquid phase from the extraction zone, separating solvent therefrom and returning the remainder of said selected phase to the extraction zone at a point downstream from the point of withdrawal with respect to the flow of the solvent removed.

7. In a solvent extraction process for the separation of a liquid mixture of acrolein and propionaldehyde by intimately contacting said mixture with countercurrently flowing streams of solvents, said solvents being xylene and water, xylene being admitted into one end of the extraction zone and water being admitted into the other end of the extraction zone and wherein the liquid mixture to be separated is introduced at an intermediate section of the extraction zone, the improvement which comprises maintaining the weight ratios of water to xylene in the upper and lower sections of the extraction zone substantially different by withdrawing a portion of a selected liquid phase from the extraction zone, removing solvent therefrom and returning the remainder of said selected liquid phase to the extraction zone at a point downstream from the point of withdrawal with respect to the flow of the solvent removed.

8. In a solvent extraction process for the separation of a liquid mixture of acrolein and propionaldehyde by intimately contacting said mixture with countercurrently flowing streams of solvents, said solvents being isobutylene and water, isobutylene being admitted into one end of the extraction zone and water being admitted into the other end of the extraction zone and wherein the liquid mixture to be separated is introduced at an intermediate section of the extraction zone the improvement which comprises maintaining the weight ratio of water to isobutylene in the upper and lower sections of the extraction zone substantially different by withdrawing a portion of a selected liquid phase from the extraction zone, removing solvent therefrom and returning the remainder of said selected liquid phase to the extraction zone at a point downstream from the point of withdrawal with respect to the flow of the solvent removed.

9. In a solvent extraction process for the separation of a liquid mixture of acrolein and propionaldehyde by intimately contacting said mixture with countercurrently flowing streams of solvents, said solvents being xylene and water, xylene being admitted into one end of the extraction zone and water being admitted into the other end of the extraction zone and wherein the liquid mixture to be separated is introduced at an intermediate section of the extraction zone, the improvement which comprises maintaining the weight ratio of water to xylene in the upper section of the extraction zone greater than 1.0 and in the lower section of the extraction zone less than 1.0 by withdrawing a portion of the liquid water phase from the upper section of the extraction zone, removing water therefrom and returning the remainder of the water phase to the extraction zone at a point downstream from the point of withdrawal with respect to the flow of water in the extraction zone.

10. In a solvent extraction process for the separation of a mixture containing components X and Y to be separated wherein Y is the principal component and X is the minor component, by intimately contacting said mixture with countercurrently flowing streams of two immiscible solvents, S and B, said solvents S and B being selected such that the distribution coefficient of the minor component X between solvents S and B is less than one and the distribution coefficient of the principal component Y between solvents S and B is greater than one wherein one of said solvents is introduced at one end of the extraction zone and another of said solvents is introduced at the other end of the extraction zone and wherein the liquid mixture to be separated is introduced at an intermediate section of the extraction zone, the improvement which comprises maintaining the weight ratio of solvent B to solvent S substantially greater in a first zone of the extraction system than in a second zone downstream with respect to the flow of solvent B from said first zone by withdrawing from a section of said first zone a liquid phase containing solvent B as the principal solvent component thereof and a portion of feed components X and Y, removing at least a substantial portion of solvent B therefrom and returning the remainder of said liquid phase now enriched with respect to components X and Y to said second zone.

11. In a solvent extraction process for the separation of a mixture containing components X and Y to be separated wherein Y is the principal component and X is the minor component, by intimately contacting said mixture with countercurrently flowing streams of two immiscible solvents, S and B, said solvents S and B being selected such that the distribution coefficient of the minor component X between solvents S and B is less than one and the distribution coefficient of the principal component Y between solvents S and B is greater than one wherein one of said solvents is introduced at one end of the extraction zone and another of said solvents is introduced at the other end of the extraction zone and wherein the liquid mixture to be separated is introduced at an intermediate section of the extraction zone, the improvement which comprises maintaining the weight ratio of solvent B to solvent S greater than one in a first zone of the extraction system and less than one in a second zone downstream with respect to the flow of solvent B from said first zone by withdrawing from a section of said first zone a liquid phase containing solvent B as the principal solvent component thereof and a portion of feed components X and Y, removing at least a substantial portion of solvent B therefrom and returning the remainder of said liquid phase now enriched with respect to components X and Y to said second zone.

MALCOLM L. SAGENKAHN.

REFERENCES CITED

The following references are of record in the file of this patent:

UNITED STATES PATENTS

| Number | Name | Date |
|---|---|---|
| 2,037,319 | Fenske et al. | Apr. 14, 1936 |
| 2,064,422 | Fenske et al. | Dec. 15, 1936 |
| 2,107,681 | Van Dijck | Feb. 8, 1938 |
| 2,296,958 | Stanley et al. | Sept. 29, 1942 |